United States Patent [19]
Cline et al.

[11] Patent Number: 5,828,371
[45] Date of Patent: Oct. 27, 1998

[54] METHOD AND SYSTEM FOR GRAPHIC VIDEO IMAGE PRESENTATION CONTROL

[75] Inventors: Troy Lee Cline, Cedar Park; Scott Harlan Isensee, Georgetown; Ricky Lee Poston, Austin, all of Tex.; Jon Harald Werner, Oceanside, Calif.

[73] Assignee: International Business Machines Corporation, Armonk, N.Y.

[21] Appl. No.: 561,995

[22] Filed: Nov. 22, 1995

[51] Int. Cl.$^6$ ...................................................... G06F 15/00
[52] U.S. Cl. .......................................... 345/328; 345/348
[58] Field of Search .................................. 345/348, 349, 345/350, 351, 327, 328, 112

[56] References Cited

U.S. PATENT DOCUMENTS

| | | | |
|---|---|---|---|
| 4,485,402 | 11/1984 | Searby | 348/715 |
| 4,965,558 | 10/1990 | Saki et al. | 345/156 |
| 5,283,864 | 2/1994 | Knowlton | 345/350 |
| 5,365,360 | 11/1994 | Torres | 345/348 |
| 5,454,073 | 9/1995 | Fukushima et al. | 345/344 |
| 5,463,725 | 10/1995 | Henckel | 345/350 |
| 5,606,655 | 2/1997 | Arman et al. | 345/440 |

*Primary Examiner*—Huynh Ba
*Attorney, Agent, or Firm*—Richard A. Henkler; Andrew J. Dillon

[57] ABSTRACT

A method and system for graphic video image control of selected segments of video data from within a video presentation which includes a large number of video frames. The video frames are displayed in a stacked overlapping manner within a computer display system. Upon selection of a particular edge of the display of an uppermost frame, each frame is then slightly offset from an adjacent frame such that a small portion of each overlapped frame may be visually accessed. A user may then select some portion of the video presentation for display by observing the transition effects along the exposed edge of each frame and then graphically selecting a particular frame utilizing a graphical pointing device, such as a mouse pointer. The selected frame is then displayed and a particular portion of the video presentation, beginning at the selected frame, may then be presented, greatly enhancing the efficiency of video display control.

8 Claims, 4 Drawing Sheets ent invention relates in general to a method and
METHOD AND SYSTEM FOR GRAPHIC VIDEO IMAGE PRESENTATION CONTROL

BACKGROUND OF THE INVENTION

1. Technical Field

The present invention relates in general to a method and system for improved video presentation display control and in particular to method and system for improved video presentation control utilizing an intuitive graphical interface. Still more particularly, the present invention relates to a method and system for permitting a user to efficiently control a presentation of a segment of video data from within a video presentation utilizing a graphical interface.

2. Description of the Related Art

So-called "multimedia" data is becoming more and more common in modern computer systems. Such multimedia presentations permit audio and video to be displayed within a computer system at a level previously not possible in the computing environment. One common form of multimedia is digitized video. Digitized video comprises a serial arrangement of video frames which comprise data stored in association with other data within the frame and whereby the user may randomly access and manipulate this stored video data to create the desired presentation.

Digitized video frames are extremely useful for editing and viewing purposes; however, it is often necessary for a user to quickly select and move to a particular segment of the video data. Digital video image frames permit such random access and overcome the limitation of older serial storage methods such as video tape in that when utilizing digital video image frames the user may randomly access the data. However, a problem exists in the efficient identification of a particular segment within a large number of video frames.

The processing of video image frames is illustrated within U.S. Pat. No. 4,485,402, issued to Anthony D. Searby of Newbury, England.

One technique proposed for the manipulation of large amounts of non-video data is disclosed in Saki et al, U.S. Pat. No. 4,965,558. Collections of data are displayed within the Saki et al system as images which include three-dimensional or depth dimension indicative of the number of pages or images within the image group. When utilizing a position indicating device, such as a light pen or mouse pointer, the user may then select for display an image from within an image group by indicating a position along the depth dimension of the representative image at a location which is believed to correspond to the relative image of the image desired within the image group.

While Saki et al represents an improvement in the accessing of selected data frames within large numbers of data frame, the user must know with some certainty the approximate relative location of the desired frame within the data collection in order to utilize this technique.

It should therefore be apparent that a need exists for a method and system for efficiently controlling the presentation of a selected segment of video data from within a video presentation.

SUMMARY OF THE INVENTION

It is one object of the present invention to provide an improved method and system for video presentation display control.

It is yet another object of the present invention to provide an improved method and system for video presentation display control utilizing an intuitive graphical interface.

It is yet another object of the present invention to provide an improved method and system—for permitting a user to efficiently identify and control the presentation of a segment of video data from within a video presentation.

The foregoing objects are achieved as is now described. A method and system are disclosed for graphic video image control of selected segments of video data from within a video presentation which includes a large number of video frames. The video frames are displayed in a stacked overlapping manner within a computer display system. Upon selection of a particular edge of the display of an uppermost frame, each frame is then slightly offset from an adjacent frame such that a small portion of each overlapped frame may be visually accessed. A user may then select some portion of the video presentation for display by observing the transition effects along the exposed edge of each frame and then graphically selecting a particular frame utilizing a graphical pointing device, such as a mouse pointer. The selected frame is then displayed and a particular portion of the video presentation, beginning at the selected frame, may then be presented, greatly enhancing the efficiency of video display control.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
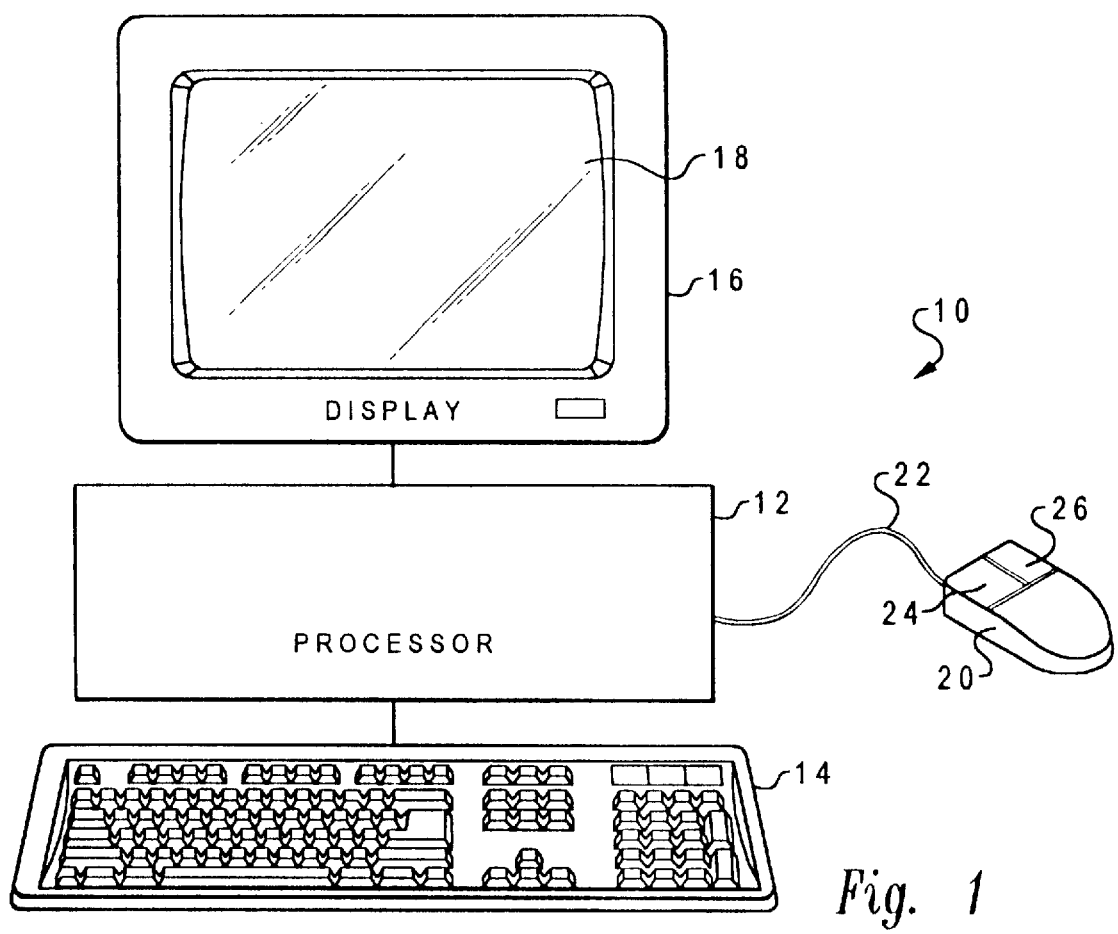
FIG. 1 is a pictorial representation of a computer system which may be utilized to implement the method and system of the present invention.

With reference now to the figures and in particular with reference to FIG. 1, there is depicted a pictorial representation of data processing system which may be programmed in accordance with the present invention. As may be seen, data processing system includes processor 12 which preferably includes a graphics processor, memory device and central processor (not shown). Coupled to processor 12 is video display 16 which may be implemented utilizing either a color or monochromatic monitor, in a manner well known in the art. Video display 16 preferably includes a display screen 18 which may be utilized to view digital video segments in a manner well known to those skilled in the computer art. Also coupled to processor 12 is keyboard 14. Keyboard 14 preferably comprises a standard computer keyboard which is coupled to the processor by means of cable 18.

Also coupled to processor 12 is a graphical pointing device, such as mouse 20. Mouse 20 is coupled to processor 12, in a manner well known in the art, via cable 22. As is shown, mouse 20 may include left button 24, and right button 26, each of which may be depressed, or 1 "clicked", to provide command and control signals to data processing system. While the disclosed embodiment of the present invention utilizes a mouse, those skilled in the art will appreciate that any graphical pointing device such as a light pen, cursor keys or touch sensitive screen may be utilized to implement the method and system of the present invention. Upon reference to the foregoing those skilled in the art will appreciate that data processing system may be implemented utilizing a so-called personal computer, manufactured by International Business Machines corporation of Armonk, N.Y.

Figure 2:
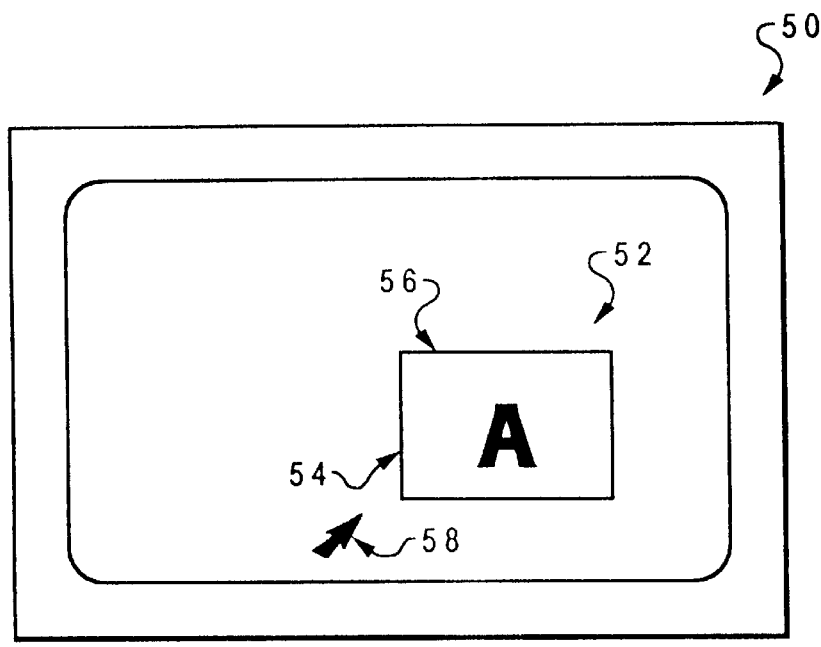
FIG. 2 is a pictorial representation of a single uppermost video frame within a video presentation which may be manipulated in accordance with the method and system of the present invention.

Referring now to FIG. 2 there is depicted a pictorial representation of a single uppermost video frame within a video presentation which may be manipulated in accordance with the method and system of the present invention. As depicted, display image 50 includes a display of the uppermost frame of a video presentation 52. The uppermost frame is, as will be appreciated upon reference thereto, rectangular in nature and includes a plurality of edges for each frame underlying the depicted frame, such as left-most edge 54 and uppermost edge 56. A mouse pointer 58 is also depicted, although those ordinarily killed in the art will appreciate that the method and system of the present invention may be implemented utilizing any suitable graphical pointing device such as a "cutting tool" "slicing tool" or other forms of graphical pointer.

Figure 3:
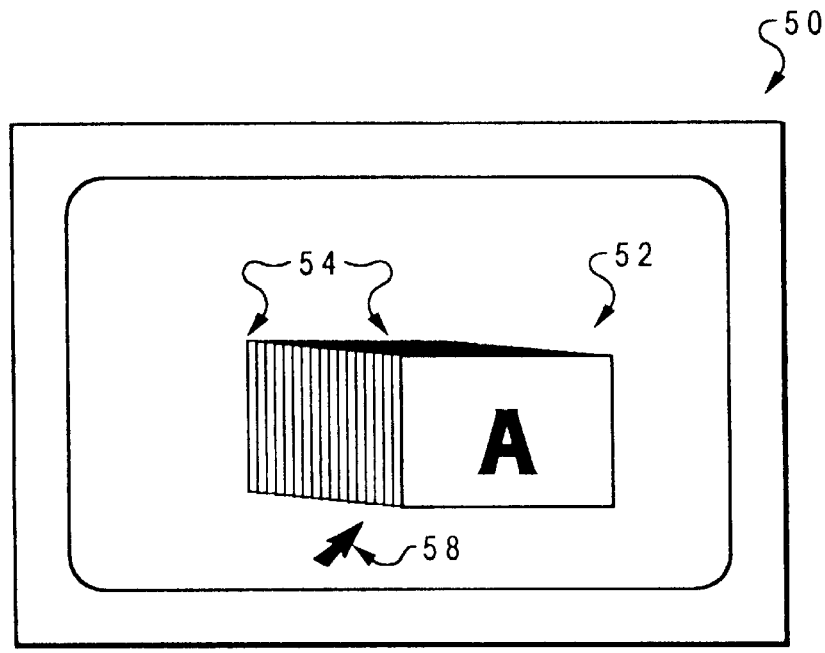
FIG. 3 is a pictorial representation of a plurality of video frames within a video presentation displayed in an offset manner in accordance with the method and system of the present invention.

With reference now to FIG. 3 there is depicted a pictorial representation of a plurality of video frames within a video presentation which are displayed in an offset manner in accordance with the method and system of the present invention. As depicted within FIG. 3, in response to selection of left-most edge 54 utilizing mouse pointer 58, or any other suitable graphical pointing device, each frame within the video presentation has been slightly offset from an adjacent underlying video frame such that a small portion of each underlying video frame may be visually accessed by a user of the computer system. While for purposes of illustration the exposed segment of each frame is left blank, those having ordinary skill in the art will appreciate that transition effects, such as changes from day to night, a person or object entering the frame or other alterations in the image, may be easily discerned by visually inspecting the small edge portion of each video frame which is displayed in accordance with the method and system of the present invention. Further, the exposed segment may show the uppermost portion of each image or a scaled representation of the entire image.

Figure 4:
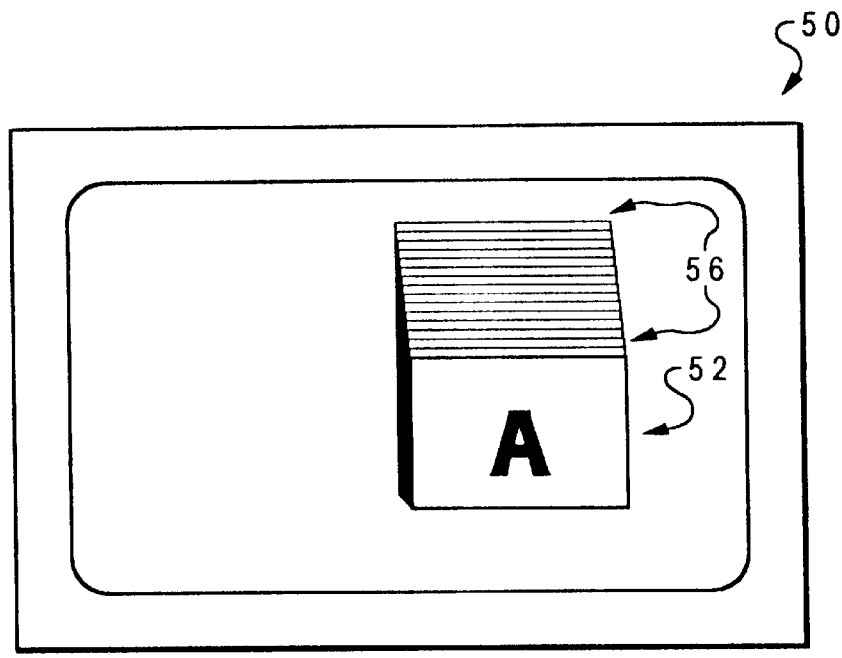
FIG. 4 is a pictorial representation of a plurality of video frames within a video presentation displayed in an alternate offset manner in accordance with the method and system of the present invention.

Referring now to FIG. 4 there is illustrated a pictorial representation of a plurality of video frames within a video presentation displayed in an alternate offset manner in accordance with the method and system of the present invention. As depicted herein, uppermost edge 56 of the video frame has been selected utilizing mouse pointer 58 and each frame within the video presentation is thereafter slightly offset away from an adjacent underlying video frame such that a small portion of the upper edge of each video frame may be displayed. In this manner the user may select which edge of each video frame to visually review in order that transition effects which are known to occur in a particular area of the video frame may be located with great efficiency.

Figure 5:
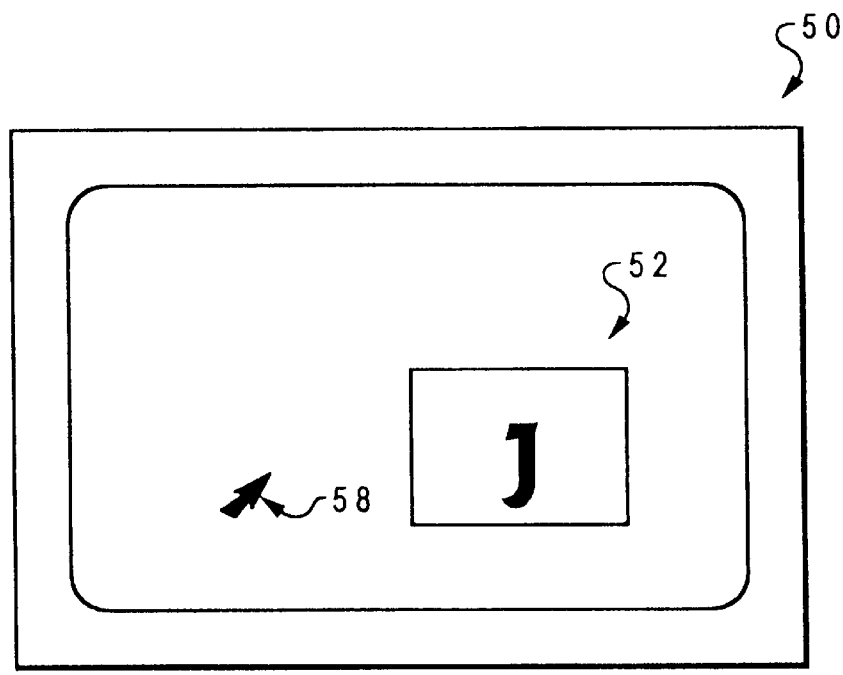
FIG. 5 is a pictorial representation of a single video frame selected from the plurality of video frames displayed within FIG. 3 in accordance with the method and system of the present invention.

With reference now to FIG. 5 there is illustrated a single video frame selected from within the plurality of video presentation indicated at reference numeral 52. This single frame is selected by identifying a particular frame along either edge 54 or edge 56, in the embodiments depicted within FIGS. 3 and 4, utilizing a pointing device such as mouse pointer 58. Thereafter, the user may elect to present a segment of video data in real time by entering a subsequent command to the data processing system 10 in a manner well known to those having ordinary skill in the art.

Figure 6:
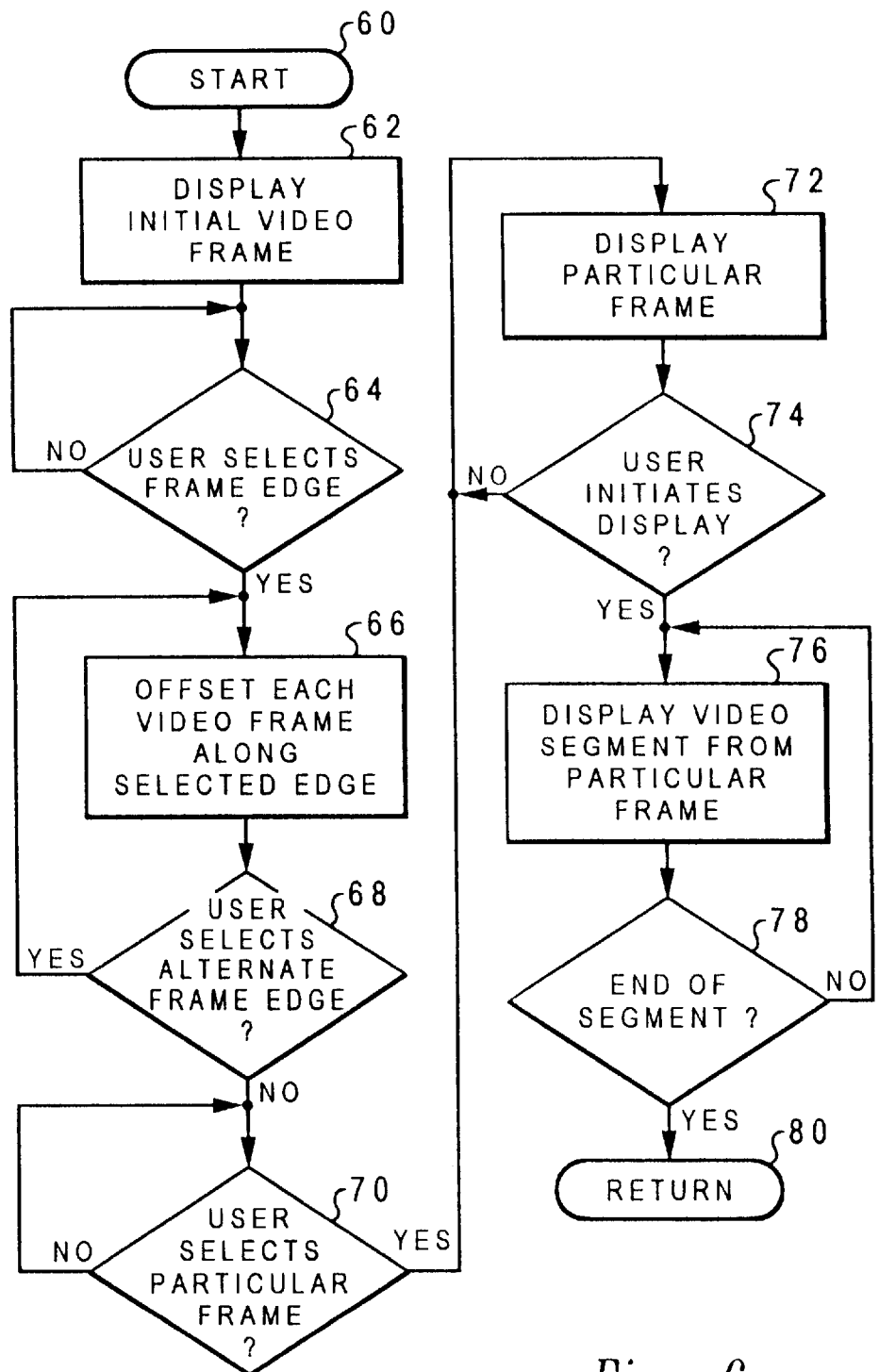
FIG. 6 is a high level logic flowchart which illustrates an implementation of the method and system of the present invention.

Finally, with reference to FIG. 6 there is a high level logic flowchart which illustrates an implementation of the method and system of the present invention, when implemented within a suitable data processing system, such as data processing system 10.

As depicted, this process begins at block 60 and thereafter passes to block 62. Block 62 illustrates the display of the initial video frame of the video presentation, in the manner illustrated within FIG. 2 in the present application.

Next, the process passes to block 64. Block 64 illustrates the election by the user of a particular frame edge of the video presentation, such as left-most edge 54 or uppermost edge 56. In the event the user has not selected a frame edge the process merely iterates until such time as an appropriate frame edge has been selected.

Next, after a user has selected a frame edge from the initial video frame display the process passes to block 66. Block 66 illustrates the offsetting of each video frame along a selected edge. As depicted in the present application this offset is a slight offset away from and parallel to the corresponding edge of an overlapping digital video frame, permitting a user to visually observe transitional effects within each edge of each video frame.

Next, the process passes to block 68. Block 68 illustrates a determination of whether or not the user has selected an alternate frame edge. In such circumstances, those having skill in the art will appreciate that a transitional effect which is sought by the user may not be visible along the chosen edge and the user may then select an alternate edge to attempt to observe the transitional effect which represents a desired location within the video presentation.

If the user has selected an alternate frame edge the process returns to block 66 to offset each video frame in the manner described above. Alternatively, in the event the user has not selected an alternate frame edge the process passes to block 70. Block 70 illustrates a determination of whether or not the user has selected a particular frame from the offset video frames which are displayed in the manner set forth within FIGS. 3 and 4. If not, the process merely iterates until such time as the user does select a particular frame.

In the event the user has selected a particular frame, utilizing use pointer 58 or any other suitable graphical pointing device the process passes to block 72. Block 72 illustrates the display of the particular frame which has been selected by the user by means of visually accessing a small portion of the edge of each video frame within the presentation. The process then passes to block 74. Block 74 depicts a determination of whether or not the user has initiated display of the video presentation and if not, the process returns to block 72 in an iterative fashion to continue to display the particular frame selected by the user.

Still referring to block 74, in the event the user has initiated display of a segment of video data beginning with the selected frame, by means of a subsequent command or input to the data processing system in a manner well known to those having ordinary skill in the art, the process passes to block 76. Block 76 illustrates the displaying of a video segment beginning with the particular frame selected by the user. Thereafter, the process passes to block 78. Block 78 illustrates a determination of whether or not the video segment has concluded and if not, the process returns to block 76 in an iterative fashion. Alternatively, in the event the end the segment has occurred, the process passes to block 80 and returns, to await a subsequent input to data processing system by the user.

Upon reference to the foregoing those skilled in the art will appreciate that the inventors herein have provided a method and system whereby a particular segment within a video presentation comprised of a plurality of video frames may be efficiently accessed and controlled by selectively and dynamically offsetting each of a plurality of video frames within a computer display system by a slight amount away from and parallel to the edge of an overlapping video frame such that transition video effects within each frame may be observed within that area. In this manner the user may efficiently and rapidly search for and select a desired location within a video presentation to examine a particular video frame or initiate the presentation of a video segment beginning at that point.

While the invention has been particularly shown and described with reference to a preferred embodiment, it will be understood by those skilled in the art that various changes in form and detail may be made therein without departing from the spirit and scope of the invention.

We claim:

1. A method for efficiently controlling the presentation of a selected segment of video data within a video presentation which comprises a plurality of individual video frames, each video frame containing video data, said method comprising the computer system implemented steps of:

displaying within said computer system a video frame icon representative of a plurality of serially adjacent overlapping video frames;

selecting an edge of said video frame icon;

offsetting each serially adjacent overlapping video frame slightly away from an adjacent overlapping video frame along said selected edge, wherein a small portion of video data within each underlying video frame may be visually accessed by a user of said computer system; and displaying within said computer system a particular video frame in response to selection of said particular frame by a user of said computer system.

2. The method for efficiently controlling the presentation of a selected segment of video data according to claim 1, wherein each of said plurality of individual video frames is rectangular in shape and wherein said step of offsetting each displayed video frame slightly away from an adjacent overlapping video frame along said selected edge comprises the step of offsetting an edge of each displayed overlapping video frame slightly away from and parallel to a corresponding edge of an adjacent underlying video frame.

3. The method for efficiently controlling the presentation of a selected segment of video data according to claim 2, wherein said step of offsetting an edge of each displayed overlapping video frame slightly away from and parallel to a corresponding edge on an adjacent underlying video frame along said selected edge comprises the step of offsetting said selected edge of each displayed overlapping video frame slightly away from and parallel to a corresponding edge of an adjacent underlying video frame in response to a graphic selection of said selected edge by a user of said computer system.

4. The method for efficiently controlling the presentation of a selected segment of video data according to claim 1, further including the step of displaying a selected segment of video data beginning with said particular video frame in response to an additional input to said computer system by user.

5. A system for efficiently controlling the presentation of a selected segment of video data within a video presentation which comprises a plurality of individual video frames, each video frame containing video data, said system comprising:

a display device for displaying a video frame icon representative of a plurality of serially adjacent overlapping video frames;

means for selecting an edge of said video frame icon;

processor means coupled to said display device for offsetting each displayed video frame slightly away from an adjacent overlapping video frame along said selected edge wherein a small portion of video data within each underlying video frame may be visually accessed by a user of said system; and graphics processor means coupled to said display device for displaying within said display device a particular video frame in response to selection of said particular video frame by a user of said system.

6. The system for efficiently controlling the presentation of a selected segment of video data according to claim 5, wherein each of said plurality of individual video frames is rectangular in shape and wherein said processor means comprises means for offsetting an edge of each displayed overlapping video frame along said selected edge slightly away from and parallel to a corresponding edge of an underlying video frame.

7. The system for efficiently controlling the presentation of a selected segment of video data according to claim 6, wherein said means for offsetting an edge of each displayed overlapping video frame slightly away from and parallel to a corresponding edge on an adjacent underlying video frame along said selected edge comprises means for offsetting said selected edge of each displayed overlapping video frame slightly away from and parallel to a corresponding edge of an adjacent underlying video frame in response to a graphic selection of said selected edge by a user of said computer system.

8. The system for efficiently controlling the presentation of a selected segment of video data according to claim 1, further including means for displaying a selected segment of video data beginning with said particular video frame in response to an additional input to said computer system by user.

* * * * *

UNITED STATES PATENT AND TRADEMARK OFFICE
CERTIFICATE OF CORRECTION

PATENT NO. : 5,828,371
DATED : October 27, 1998
INVENTOR(S) : Cline et al.

It is certified that error appears in the above-identified patent and that said Letters Patent is hereby corrected as shown below:

On the title page, Item [54], and Column 1, please change "GRAPHIC" to --GRAPHICAL--.

Column 1, line 1, please change "GRAPHIC" to -- GRAPHICAL--.

Signed and Sealed this

Thirteenth Day of July, 1999

Attest:

Q. TODD DICKINSON

Attesting Officer

Acting Commissioner of Patents and Trademarks